US012117143B1

(12) United States Patent
Xu et al.

(10) Patent No.: US 12,117,143 B1
(45) Date of Patent: Oct. 15, 2024

(54) LED LAMP WITH LENS PANEL FIXED TO ROTATING SHAFT

(71) Applicant: SHENZHEN SNC OPTO ELECTRONIC CO., LTD., Guangdong (CN)

(72) Inventors: Jianyong Xu, Guangdong (CN); Zhiping Ma, Guangdong (CN)

(73) Assignee: SHENZHEN SNC OPTO ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 18/616,234

(22) Filed: Mar. 26, 2024

(30) Foreign Application Priority Data

Nov. 30, 2023 (CN) ......................... 202323242378.6

(51) Int. Cl.
*F21V 14/06* (2006.01)
*F21V 5/00* (2018.01)
*F21Y 115/10* (2016.01)

(52) U.S. Cl.
CPC ............. *F21V 14/06* (2013.01); *F21V 5/007* (2013.01); *F21Y 2115/10* (2016.08)

(58) Field of Classification Search
CPC ................................ F21V 14/06; F21V 5/007
See application file for complete search history.

(56) References Cited

U.S. PATENT DOCUMENTS

| | | | | |
|---|---|---|---|---|
| 11,391,441 | B2 * | 7/2022 | Boonekamp | G02B 26/023 |
| 2011/0018448 | A1 * | 1/2011 | Metchear, III | F21S 8/083 362/183 |
| 2014/0233252 | A1 * | 8/2014 | Shibata | B60Q 1/007 362/547 |
| 2014/0321132 | A1 * | 10/2014 | Shibata | B60Q 1/115 362/460 |
| 2016/0201869 | A1 * | 7/2016 | Shibata | F21S 41/192 362/512 |
| 2019/0338922 | A1 * | 11/2019 | Jurik | F21V 14/06 |
| 2022/0290845 | A1 * | 9/2022 | Gladden | F21V 5/007 |

* cited by examiner

*Primary Examiner* — Tracie Y Green
*Assistant Examiner* — Michael Chiang

(57) ABSTRACT

An LED lamp includes a radiator including a lamp panel mounting member and a power supply mounting member connected to an end of the lamp panel mounting member, the lamp panel mounting member being provided with a mounting cavity; an LED lamp panel fixed in the mounting cavity; a driving power supply mounted on the power supply mounting member and electrically connected to the LED lamp panel; a pressing frame assembly configured to press the lens panel against the radiator, a rotating shaft rotatably connected to the radiator; and a lens panel covering the LED lamp panel and fixed to the rotating shaft.

9 Claims, 4 Drawing Sheets

LED LAMP WITH LENS PANEL FIXED TO ROTATING SHAFT

CROSS-REFERENCE TO RELATED APPLICATIONS

This application claims priority of Chinese Patent Application No. 202323242378.6, filed on Nov. 30, 2023, entitled "LED LAMP", the entire content of which is incorporated herein in its entirety.

TECHNICAL FIELD

The present disclosure relates to lighting technology, and in particular to an LED lamp.

BACKGROUND

Generally, LED lamps need to use different light distribution angles under different operating environments. However, the conventional LED lamps have fixed light distribution angles, so that it is difficult for users to adjust the light distribution angles by themselves, and more lamps need to be provided to meet the requirements of different light distribution angles. As a result, the cost of purchasing lamps is increased.

Therefore, it is necessary to improve a structure of the LED lamp.

SUMMARY

According to various embodiments, an LED lamp capable of adjusting a light distribution angle is provided.

An LED lamp includes a radiator including a lamp panel mounting member and a power supply mounting member connected to an end of the lamp panel mounting member, the lamp panel mounting member being provided with a mounting cavity; an LED lamp panel fixed in the mounting cavity; a driving power supply mounted on the power supply mounting member and electrically connected to the LED lamp panel; a pressing frame assembly configured to press the lens panel against the radiator; a rotating shaft rotatably connected to the radiator; and a lens panel covering the LED lamp panel and fixed to the rotating shaft.

When light distribution of the LED lamp needs to be adjusted, an angle of the lens panel can be adjusted by rotating the rotating shaft, so as to meet different light distribution angle requirements.

In one of the embodiments, the LED lamp panel and the lens panel are both accommodated in the mounting cavity, the pressing frame assembly includes a pressing frame and a glass plate, and the glass plate presses the lens panel.

In one of the embodiments, the pressing frame is fixedly attached to a cavity wall of the mounting cavity.

In one of the embodiments, the pressing frame assembly further includes a fixing block, a receiving hole is provided on a cavity wall of the mounting cavity, a bottom portion of the fixing block is inserted into the receiving hole, and a top portion of the fixing block fixes the pressing frame to the cavity wall of the mounting cavity.

The pressing frame assembly includes the fixing block, so that the pressing frame can be more stably fixed on the radiator.

In one of the embodiments, the rotating shaft is located on a rear side of the LED lamp panel, a rear side of the lens panel is provided with a fixing base, the LED lamp panel is provided a first notch corresponding to the fixing base, and the fixing member extends through the first notch and is fixed on the rotating shaft.

In one of the embodiments, the LED lamp further includes an adjusting assembly, the lamp panel mounting member is further provided with a rotating shaft accommodating groove in communication with the mounting cavity and a second notch extending through a side of the lamp panel mounting member, the rotating shaft is received in the rotating shaft accommodating groove, and an end of the rotating shaft extends through the second notch and is connected to the adjusting assembly.

In one of the embodiments, the adjusting assembly includes a knob and a fixing plate, the end of the rotating shaft is fixed to the knob, the knob is rotatably connected to the fixing plate, and the fixing plate is fixed to an outer side of the lamp panel mounting member through the fixing plate.

In one of the embodiments, a side of the knob adjacent to the lamp panel mounting member is provided with a protruding cylinder, the fixing plate is provided with a circular hole, the protruding cylinder is rotatably received in the circular hole, and the adjusting assembly further comprises a sealing ring provided between the knob and the fixing plate.

In one of the embodiments, the power supply mounting member includes a power supply accommodating chamber, a power supply cover plate covering the power supply accommodating chamber, and a snap-fit assembly, the driving power supply is mounted in the power supply accommodating chamber, an end of the power supply cover plate is hinged with the radiator, and another end of the power supply cover plate is detachably connected to the radiator through the snap-fit assembly.

In one of the embodiments, the LED lamp further includes an optical controller and a microwave sensor both fixed to the power supply mounting member.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

Figure 1:
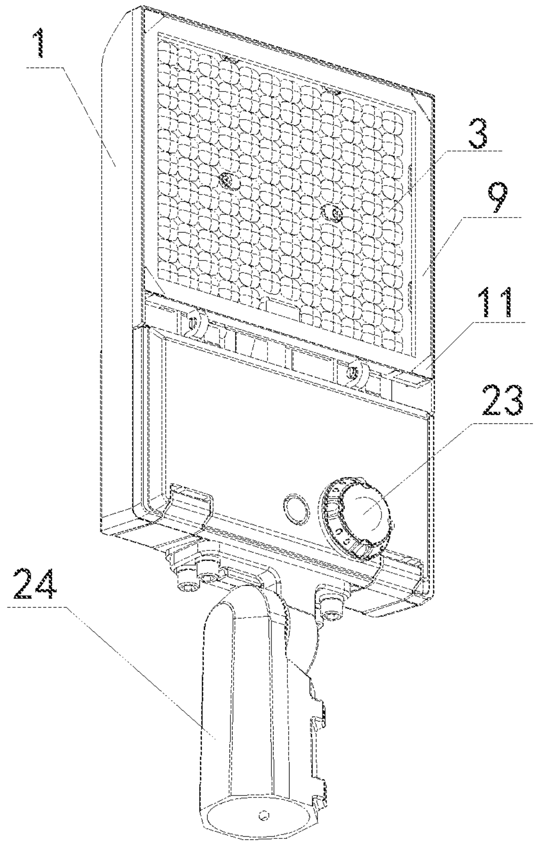
FIG. 1 is a perspective view of an LED lamp according to an embodiment.
Figure 2:
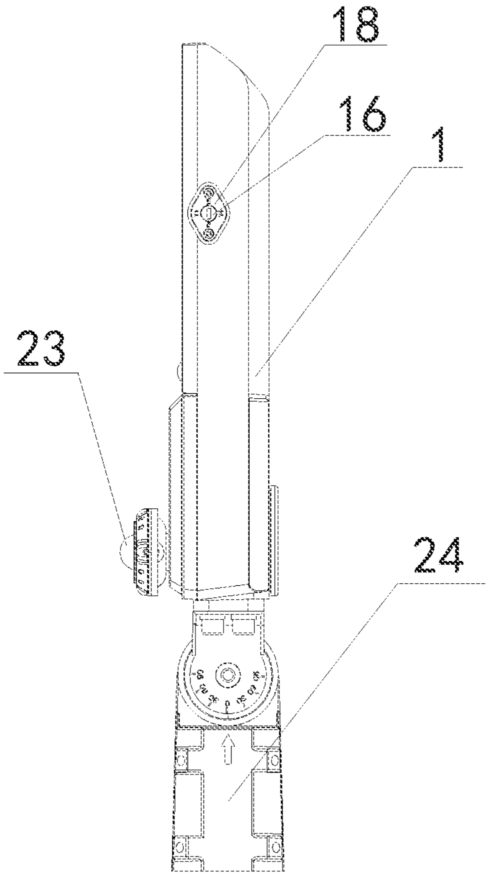
FIG. 2 is a right-side view of the LED lamp shown in FIG. 1.

1. Radiator; 2. Lamp panel mounting member; 3. Power supply mounting member; 4. LED lamp panel; 5. Lens panel; 6. Driving power supply; 7. Mounting cavity; 8. Rotating shaft; 9. Pressing frame; 10. Glass plate; 11. Fixing block; 12. Receiving hole; 13. Fixing base; 14. Rotating shaft accommodating groove; 15. Connecting portion; 16.

Knob; 17. First sealing ring; 18. Fixing plate; 19. Power supply accommodating chamber; 20. Power supply cover plate; 21. Snap-fit assembly; 22. Optical controller; 23. Microwave sensor; 24. Mounting bracket; 25. First connecting member; 26. Second connecting member; 27. Optical controller base; 30. Adjusting assembly; 40. Second sealing ring; 41. First notch; 142. Second notch; 161. Connecting hole; 162. Protruding cylinder; 181. Circular hole.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 5, an LED lamp is provided according to an embodiment of the present disclosure, including a radiator 1, an LED lamp panel 4, a lens panel 5, and a driving power supply 6. The radiator 1 includes a lamp panel mounting member 2 and a power supply mounting member 3 connected to an end of the lamp panel mounting member 2. The driving power supply 6 is mounted on the power supply mounting member 3. The lamp panel mounting member 2 is provided with a mounting cavity 7, and the LED lamp panel 4 and the lens panel 5 are fixed in the mounting cavity 7. The lens panel 5 covers the LED lamp panel 4. The LED lamp panel 4 is electrically connected to the driving power supply 6.

The LED lamp further includes a rotating shaft 8. The rotating shaft 8 is rotatably connected to the radiator 1, and the lens panel 5 is fixed to the rotating shaft 8. When light distribution of the LED lamp needs to be adjusted, an angle of the lens panel 5 can be adjusted by rotating the rotating shaft 8, so as to meet different light distribution angle requirements.

Figure 3:
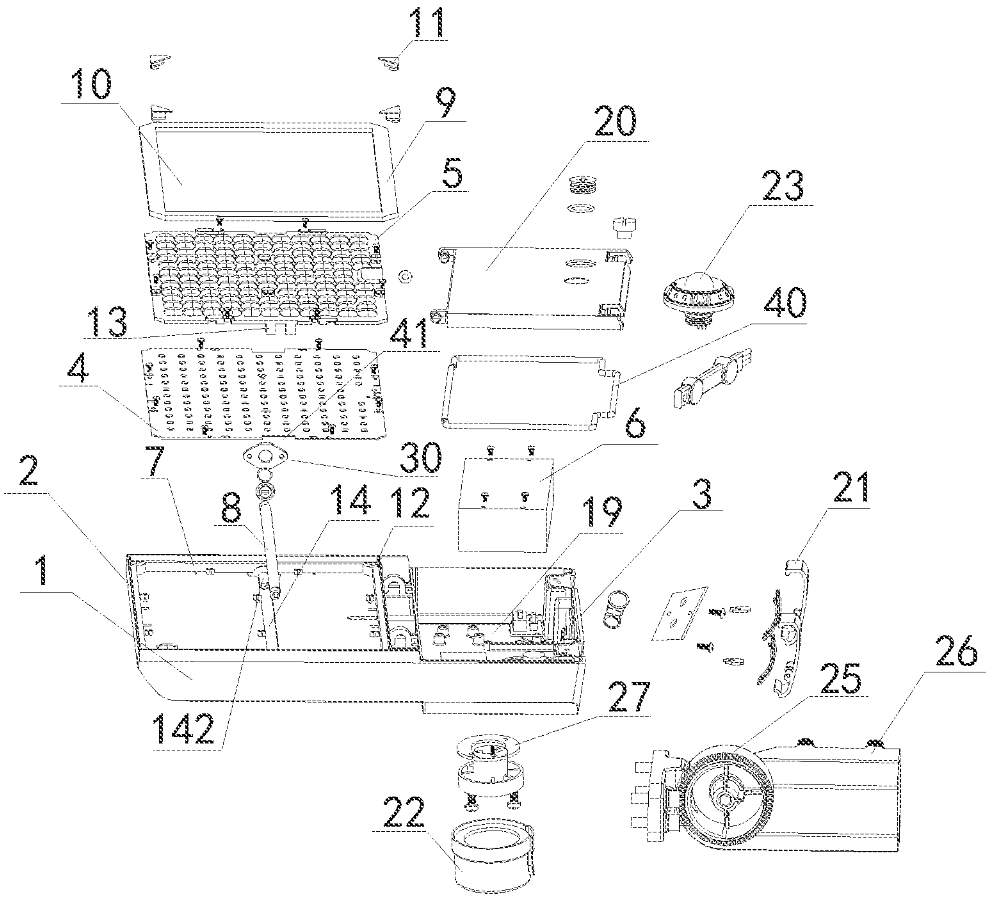
FIG. 3 is an exploded view of the LED lamp shown in FIG. 1.

The LED lamp further includes a pressing frame assembly configured to press the lens panel 5 against the radiator 1. Referring to FIG. 3, the pressing frame assembly includes a pressing frame 9 and a glass plate 10. The pressing frame 9 is fixedly attached to a cavity wall of the mounting cavity 7. The glass plate 10 presses the lens panel 5.

The pressing frame assembly further includes a plurality of fixing blocks 11. A plurality of receiving holes 12 are correspondingly provided on the cavity wall of the mounting cavity 7. A bottom portion of the fixing block 11 is inserted into the receiving hole 12, and a top portion of the fixing block 11 fixes the pressing frame 9 to the cavity wall of the mounting cavity 7. The pressing frame 9 can be more stably fixed on the radiator 1 through the fixing block 11.

The rotating shaft 8 is located on a rear side of the LED lamp panel 4. A rear side of the lens panel 5 is provided with a fixing base 13. The LED lamp panel 4 is provided a first notch 41 corresponding to the fixing base 13, and the fixing member 13 extends through the first notch 41 and is fixed on the rotating shaft 8. In an embodiment, the fixing base 13 includes two clamping sheets spaced apart from each other. The two clamping sheets extend though the first notch 41 and clamp the rotating shaft 8.

The lamp panel mounting member 2 is further provided with a rotating shaft accommodating groove 14 and two second notches 142 located at both ends of the rotating shaft accommodating groove 14. The rotating shaft accommodating groove 14 is in communication with the mounting cavity 7, and the rotating shaft 8 is received in the rotating shaft accommodating groove 14. One of the second notches 142 extends through a side of the lamp panel mounting member 2. Referring to FIG. 3, the LED lamp further includes an adjusting assembly 30. An end of the rotating shaft 8 extends through the second notch 142 and is connected to the adjusting assembly 30.

Figure 4:
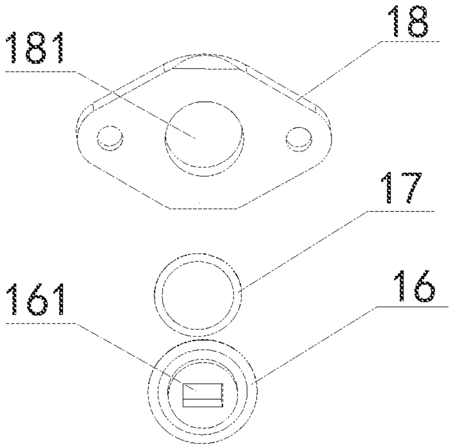
FIG. 4 is an enlarged view of an adjusting assembly shown in FIG. 3.

Referring to FIG. 4, the adjusting assembly 30 includes a knob 16, a first sealing ring 17, and a fixing plate 18. The end of the rotating shaft 8 is provided with a connecting portion 15 (see FIG. 5), which is inserted into and fixed to the knob 16. In an embodiment, the knob 16 is provided with a rectangular connecting hole 161, the connecting portion 15 is rectangular, so as to cooperate with the rectangular connecting hole 161. The knob 16 is rotatably connected to the fixing plate 18, and the fixing plate 18 is fixed to an outer side of lamp panel mounting member 2.

Figure 5:
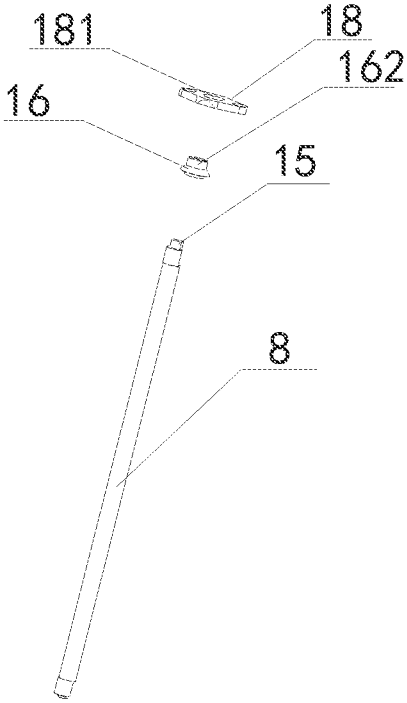
FIG. 5 is an enlarged view of a rotating shaft and the fixing plate shown in FIG. 3.

Referring to FIG. 5, a side of the knob 16 adjacent to the lamp panel mounting member 2 is provided with a protruding cylinder 162, and the connecting hole 161 extends through the protruding cylinder 162. The fixing plate 18 is provided with a circular hole 181 corresponding to the protruding cylinder 162, and the protruding cylinder 162 is rotatably received in the circular hole 181, and an end of the knob 16 away from the lamp panel mounting member 2 is located on a side of the fixing plate 18 away from the lamp panel mounting member 2. When adjusting the light distribution, the knob 16 is rotated clockwise or counterclockwise, so as to rotate the connecting portion 15 clockwise or counterclockwise, so that the rotating shaft 8 is rotated clockwise or counterclockwise, so as to adjust the light distribution angle of the lens panel 5.

The first sealing ring 17 is provided between the knob 16 and the fixing plate 18, so that the adjusting assembly 30 has good waterproof effect.

Referring to FIG. 3, the power supply mounting member 3 includes a power supply accommodating chamber 19, a power supply cover plate 20 covering the power supply accommodating chamber 19, and a snap-fit assembly 21. The driving power supply 6 is mounted in the power supply accommodating chamber 19. One end of the power supply cover plate 20 is hinged to the radiator 1, and the other end of the power supply cover plate 20 is detachably connected to the radiator 1 through the snap-fit assembly 21.

The power supply mounting member 3 further includes a second sealing ring 40 provided between the power supply cover plate 20 and the power supply accommodating chamber 19, so as to provide good waterproof effect for driving power supply 6.

The LED lamp further includes an optical controller 22 and a microwave sensor 23 both provided on the power supply mounting member 3. The optical controller 22 includes an optical controller base 27 fixed to a bottom portion of the power supply mounting member 3. The microwave sensor 23 is fixed to an upper surface of the power supply mounting member 3.

The LED lamp further includes a mounting bracket 24 provided at a bottom portion of the radiator 1. The mounting bracket 24 includes a first connecting member 25 and a second connecting member 26. The first connecting member 25 is connected to the radiator 1. The second connecting member 26 is connected to a lamp body mounting object.

According to the LED lamp, when different light distribution is required, the lens panel 5 can be adjusted to the required light distribution angle according to the requirement.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a radiator comprising a lamp panel mounting member and a power supply mounting member connected to an end of the lamp panel mounting member, the lamp panel mounting member being provided with a mounting cavity;

an LED lamp panel fixed in the mounting cavity;

a driving power supply mounted on the power supply mounting member and electrically connected to the LED lamp panel;

a rotating shaft rotatably connected to the radiator;

a lens panel covering the LED lamp panel and fixed to the rotating shaft; and a pressing frame assembly configured to press the lens panel against the radiator;

wherein the LED lamp panel and the lens panel are both accommodated in the mounting cavity, the pressing frame assembly comprises a pressing frame and a glass plate, and the glass plate presses the lens panel.

2. The LED lamp according to claim 1, wherein the pressing frame is fixedly attached to a cavity wall of the mounting cavity.

3. The LED lamp according to claim 1, wherein the pressing frame assembly further comprises a fixing block, a receiving hole is provided on a cavity wall of the mounting cavity, a bottom portion of the fixing block is inserted into the receiving hole, and a top portion of the fixing block fixes the pressing frame to the cavity wall of the mounting cavity.

4. The LED lamp according to claim 3, wherein the rotating shaft is located on a rear side of the LED lamp panel, a rear side of the lens panel is provided with a fixing base, the LED lamp panel is provided a first notch corresponding to the fixing base, and the fixing member extends through the first notch and is fixed on the rotating shaft.

5. The LED lamp according to claim 4, further comprising an adjusting assembly, wherein the lamp panel mounting member is further provided with a rotating shaft accommodating groove in communication with the mounting cavity and a second notch extending through a side of the lamp panel mounting member, the rotating shaft is received in the rotating shaft accommodating groove, and an end of the rotating shaft extends through the second notch and is connected to the adjusting assembly.

6. The LED lamp according to claim 5, wherein, the adjusting assembly comprises a knob and a fixing plate, the end of the rotating shaft is fixed to the knob, the knob is rotatably connected to the fixing plate, and the fixing plate is fixed to an outer side of the lamp panel mounting member.

7. The LED lamp according to claim 6, wherein a side of the knob adjacent to the lamp panel mounting member is provided with a protruding cylinder, the fixing plate is provided with a circular hole, the protruding cylinder is rotatably received in the circular hole, and the adjusting assembly further comprises a sealing ring provided between the knob and the fixing plate.

8. The LED lamp according to claim 7, wherein the power supply mounting member comprises a power supply accommodating chamber, a power supply cover plate covering the power supply accommodating chamber, and a snap-fit assembly, the driving power supply is mounted in the power supply accommodating chamber, an end of the power supply cover plate is hinged with the radiator, and another end of the power supply cover plate is detachably connected to the radiator through the snap-fit assembly.

9. The LED lamp according to claim 1, further comprising an optical controller and a microwave sensor both fixed to the power supply mounting member.

* * * * *